US011192262B2

(12) United States Patent
Starr et al.

(10) Patent No.: US 11,192,262 B2
(45) Date of Patent: Dec. 7, 2021

(54) CONTROLLING ROBOT WITH HEAD MOUNTED CONTROLLER

(71) Applicant: RedZone Robotics, Inc., Pittsburgh, PA (US)

(72) Inventors: Justin Starr, Baden, PA (US); Galin Konakchiev, Pittsburgh, PA (US); Foster J Salotti, Verona, PA (US); Todd Kueny, Tarentum, PA (US); Thorin Tobiassen, Pittsburgh, PA (US); Nate Alford, North Huntington, PA (US); Mark Jordan, Pittsburgh, PA (US); Christopher White, Pittsburgh, PA (US)

(73) Assignee: RedZone Robotics, Inc., Warrendale, PA (US)

( * ) Notice: Subject to any disclaimer, the term of this patent is extended or adjusted under 35 U.S.C. 154(b) by 436 days.

(21) Appl. No.: 16/145,362

(22) Filed: Sep. 28, 2018

(65) Prior Publication Data

US 2019/0099896 A1    Apr. 4, 2019

Related U.S. Application Data

(60) Provisional application No. 62/565,180, filed on Sep. 29, 2017.

(51) Int. Cl.
*B25J 13/08* (2006.01)
*G06F 3/01* (2006.01)
*B25J 11/00* (2006.01)

(52) U.S. Cl.
CPC ........... *B25J 13/087* (2013.01); *B25J 11/008* (2013.01); *G06F 3/015* (2013.01); *F16L 2201/30* (2013.01)

(58) Field of Classification Search
CPC ....... B25J 13/087; B25J 11/008; G06F 3/015; G06F 3/12; F16L 2201/30
See application file for complete search history.

(56) References Cited

U.S. PATENT DOCUMENTS

| 2006/0290779 A1* | 12/2006 | Reverte | ..................... E03F 7/10 348/84 |
| 2008/0221400 A1* | 9/2008 | Lee | ......................... A61B 5/16 600/301 |

(Continued)

OTHER PUBLICATIONS

CCTV Video News Agency, China Tests Brain Controlled Robot, Youtube, Uploaded Apr. 16, 2015 (Year: 2015).*

*Primary Examiner* — Basil T. Jos
(74) *Attorney, Agent, or Firm* — Cafardi, Ferguson, Wyrick, Weis & Gabriel, LLC; Andrew M. Gabriel

(57) ABSTRACT

An embodiment provides a method of controlling a pipe inspection robot, including: detecting, from a headset, brain activity of a user wearing the headset; binning the brain activity of the user into one of a plurality of different bins; the binning comprising accumulating brain activity values for a period of time to establish a brain activity value for the period of time; determining, using the brain activity value, if a threshold level of brain activity has accumulated over the period of time; after the threshold level has been accumulated, identifying a control action to be sent to the pipe inspection robot based on the brain activity value; and controlling the movement of the pipe inspection robot using a control signal associated with the control action. Other embodiments are described and claimed.

20 Claims, 6 Drawing Sheets

(56) References Cited

U.S. PATENT DOCUMENTS

2014/0316230 A1\* 10/2014 Denison .............. A61B 5/4094
600/383
2015/0199010 A1\* 7/2015 Coleman ............. A61B 5/0006
345/156

\* cited by examiner

| Bin | Bin Threshold | Bin Observed | Control Action |
|---|---|---|---|
| Light | < 2 | | Stop |
| Moderate | 2 – 4 | | Forward |
| Heavy | > 4 | 7.5 | Reverse |

…

CONTROLLING ROBOT WITH HEAD MOUNTED CONTROLLER

CROSS-REFERENCE TO RELATED APPLICATIONS

This application claims priority to U.S. provisional patent application Ser. No. 62/565,180, having the title CONTROLLING ROBOT WITH HEAD MOUNTED CONTROLLER, filed on 29-Sep.-2017, the contents of which are incorporated by reference in their entirety herein.

FIELD

The subject matter described herein relates to collection and use of head mounted sensor data for control of a robot, e.g., a pipe inspection robot that inspects underground infrastructure assets such as water and sewer pipes.

BACKGROUND

Underground infrastructure such as municipal wastewater and sewer pipes, tunnels and chambers need to be inspected and maintained. Underground infrastructure is often visually inspected as a matter of routine upkeep or in response to a noticed issue.

Various systems and methods exist to gather inspection data. For example, pipe inspection data may be obtained by using closed circuit television (CCTV) cameras or via inspection using a mobile pipe inspection robot. Such methods are capable of traversing through a pipe with an inspection unit and obtaining data regarding the interior of the pipe, e.g., image and other sensor data for visualizing pipe features such as pipe defects, root intrusions, etc. Typically, an inspection crew is deployed to a location and individual pipe segments are inspected, often individually in a serial fashion, to collect pipe data and analyze it.

BRIEF SUMMARY

In summary, one embodiment provides a method of controlling a pipe inspection robot, comprising: detecting, from a headset, brain activity of a user wearing the headset; binning the brain activity of the user into one of a plurality of different bins; the binning comprising accumulating brain activity values for a period of time to establish a brain activity value for the period of time; determining, using the brain activity value, if a threshold level of brain activity has accumulated over the period of time; after the threshold level has been accumulated, identifying a control action to be sent to the pipe inspection robot based on the brain activity value; and controlling the movement of the pipe inspection robot using a control signal associated with the control action.

Another embodiment provides a system, comprising: a controller comprising a processor and a memory device, the controller configured to: receive digital voltage values associated with brain activity of a user detected by a headset worn by the user; bin the digital voltage values into one of a plurality of different bins; the controller being configured to accumulate digital voltage values for a period of time to establish a brain activity value for the period of time; determine, using the brain activity value, if a threshold level of brain activity has accumulated over the period of time; after the threshold level has been accumulated, identify a control action to be sent to the pipe inspection robot based on the brain activity value; and control the movement of a pipe inspection robot using a control signal associated with the control action.

A further embodiment provides a computer program product, comprising: a non-transitory storage medium having computer executable code stored therein, the computer executable code comprising: code that obtains, from a headset, brain activity of a user wearing the headset; code that bins the brain activity of the user into one of a plurality of different bins; the code that bins comprising code that accumulates brain activity values for a period of time to establish a brain activity value for the period of time; code that determines, using the brain activity value, if a threshold level of brain activity has accumulated over the period of time; code that, after the threshold level has been accumulated, identifies a control action to be sent to the pipe inspection robot based on the brain activity value; and code that controls the movement of the pipe inspection robot using a control signal associated with the control action.

The foregoing is a summary and is not intended to be in any way limiting. For a better understanding of the example embodiments, reference can be made to the detailed description and the drawings. The scope of the invention is defined by the claims.

DETAILED DESCRIPTION

Figure 1:
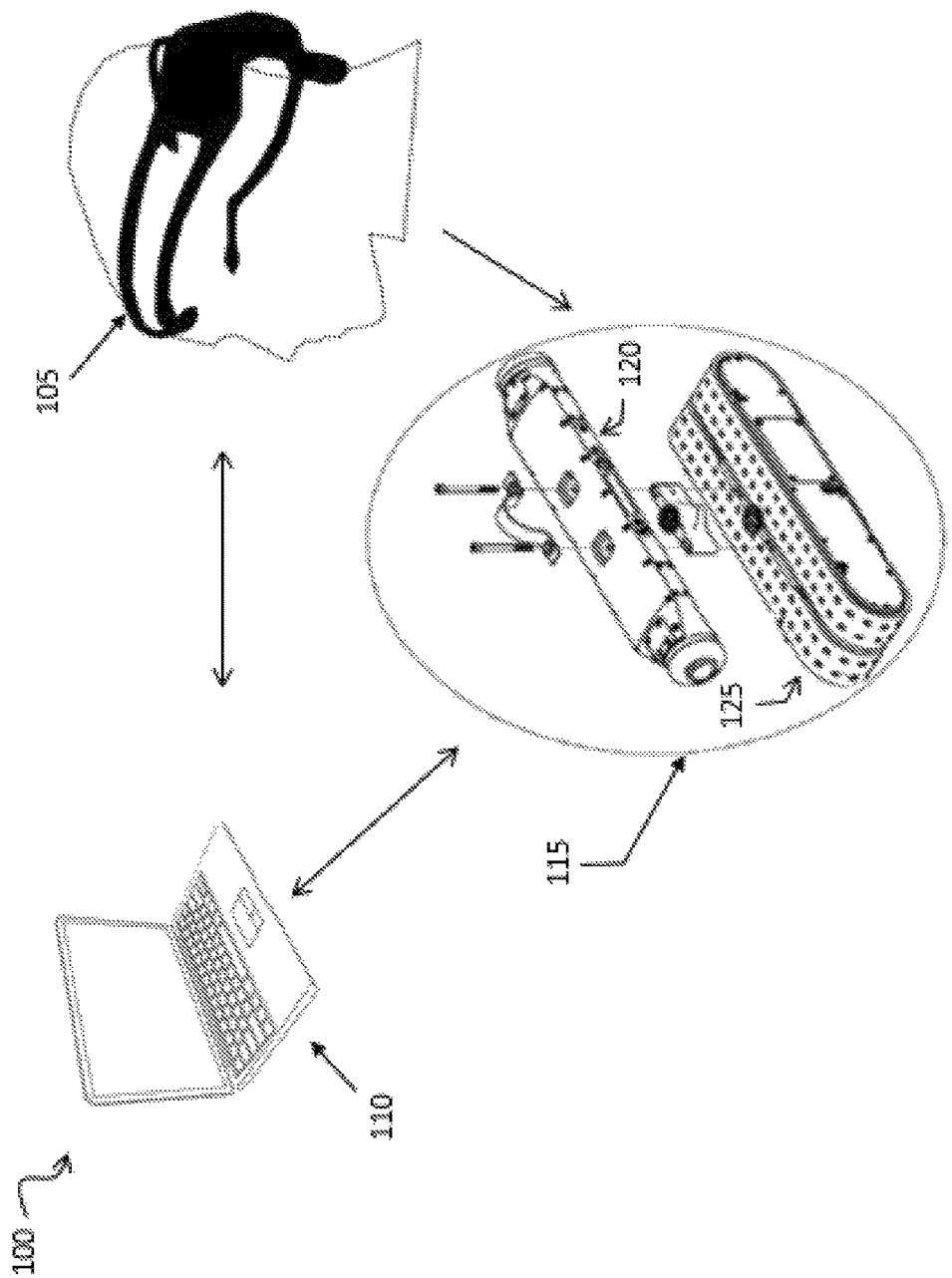
FIG. 1 illustrates an example system.

It will be readily understood that the components of the embodiments, as generally described and illustrated in the figures herein, may be arranged and designed in a wide variety of ways in addition to the examples described herein. The detailed description uses examples, represented in the figures, but these examples are not intended to limit the scope of the claims.

Reference throughout this specification to "embodiment (s)" (or the like) means that a described feature or characteristic is included in that example. This feature or characteristic may or may not be claimed. This feature or characteristic may or may not be relevant to other embodiments. For this detailed description, each example might be separable from or combined with another example, i.e., one example is not necessarily relevant to other examples.

Therefore, the described features or characteristics of the examples generally may be combined in any suitable manner, although this is not required. In the detailed description, numerous specific details are provided to give a thorough understanding of example embodiments. One skilled in the relevant art will recognize, however, that the claims can be practiced without one or more of the specific details found in the detailed description, or the claims can be practiced with other methods, components, etc. In other instances, well-known details are not shown or described in detail to avoid obfuscation.

Because the inspection process for underground infrastructure or like assets, such as municipal water and sewer pipes, tunnels, etc., is quite labor intensive, costly and time consuming, it is important to obtain high quality data from the inspection. Further, because inspections often include areas where human operators cannot go (or cannot easily access), robots are deployed. For example, a mobile pipe inspection robot may be sent through the interior of a wastewater pipe to collect pipe inspection data.

Such inspection robots may be controlled autonomously via on-board software that instructs the movements of the robot without substantial human intervention or may be controlled via an operator (teleoperation of a robot that receives instructions from a human operator at a remote location). In a tele-operated or remote operated context, a human operator provides inputs that are communicated to the pipe inspection robot, either through a wired (tethered) connection or wirelessly. For example, an operator provides input to a desktop or laptop computer, which is then communicated to the pipe inspection robot to control its movements, imaging or other data capture modes, etc. In certain cases, an inspection robot may act semi-autonomously, e.g., taking instruction from a human operator at the beginning and end of a data collection mission, and operating autonomously during the main part of the data collection mission.

An embodiment provides for the control of a pipe inspection robot, e.g., a tracked pipe inspection robot or other pipe inspection platform, such as a floating platform (herein simply "pipe inspection robot," "robot," or the like) via use of a head mounted controller. In an embodiment, the head mounted controller (also referred to as a "headset") remotely operates a pipe inspection robot for motion in at least one dimension (e.g., controlling motion in a forward direction) via thresholding of brain wave activity of the human operator wearing the head mounted controller. For example, an embodiment provides for using an electroencephalography (EEG) helmet or headset to collect brain activity data, which is binned into predetermined categories, e.g., heavy, moderate and light categories. A predetermined control function, e.g., forward driving of the pipe inspection robot, is mapped to one or more of the categories such that upon sensing via the EEG helmet or headset, the control function is activated. In an embodiment, different control functions may be activated by different levels of detected brain activity. For example, an operator closing his or her eyes, concentrating on a predetermined object, etc., may function to initiate an autonomous data collection mission or sub-routine of the inspection robot. Similarly, such detected activity may act to switch modes of the inspection robot, e.g., switching from visual data collection to laser data collection, etc.

An embodiment therefore provides a system that lets an operator control a pipe inspection robot by varying the intensity of his or her thoughts. A suitable EEG helmet may be obtained from several commercial suppliers, e.g., EMOTIVE offers an EEG headset named INSIGHT. While some effort has been made with drone controls in this area, such efforts are an attempt to translate actual patterns of activity into directions. In contrast, an embodiment knowingly defines brain activity amount categories for control of the pipe inspection robot in a single dimension, e.g., heavy activity is predefined as forward drive control. Such controls may compliment other controls, e.g., autonomous controls supplied by the pipe inspection robot's onboard capabilities, other types of human operator input (e.g., remote key input), etc.

The description now turns to the figures. The illustrated example embodiments will be best understood by reference to the figures. The following description is intended only by way of example and simply illustrates certain selected example embodiments.

Referring now to FIG. 1, an example system 100 is illustrated. In the system 100 a pipe inspection robot 115 is illustrated that may be utilized for capturing pipe inspection data, including visual images or other data such as laser or sonar scan data. The pipe inspection robot 115 is illustrated in a partially exploded view (collectively indicated at 115) in FIG. 1. As explained in more detail hereinafter, the pipe inspection robot 115 may be utilized to navigate, explore, map, etc., various environments (e.g., water pipes, sewer pipes, tunnels, large chambers, etc.). In an embodiment, the pipe inspection robot 115 may be implemented as an autonomous, tele-operated, or combination type (autonomous and human input combined, semi-autonomous) pipe inspection robot 115. It will be appreciated that the pipe inspection robot 115 may be embodied in any number of different types of inspection platforms, including non-autonomous devices and platforms, and may be utilized in a plurality of other environments.

As further shown in FIG. 1, the chassis portion of the pipe inspection robot 115 includes a tractor unit 125, which offers movement to the pipe inspection robot 115. The pipe inspection robot 115 also includes a sensor component 120, which may be configured as a multi-sensor part or component that captures visual images using a wide-angle lens, captures laser scan data using a laser and detector, and/or captures sonar or light detecting and ranging (LIDAR) data using an appropriate sonar or LIDAR unit. In the example illustrated in FIG. 1, sensor component includes multiple sensors for collecting a variety of data types that are processed to form images of a pipe's interior.

According to an embodiment, the sensor component 120 includes a computing device or other circuitry communicably connected to the sensing device(s). The computing device or other circuitry includes one or more processors for processing raw information captured by the sensing devices. Sensor component 120 also includes a memory device communicably connected to a computing device or other circuitry for storing the raw and/or processed information, and control circuitry communicably connected to the computing device or other circuitry for controlling various components of the pipe inspection robot 115. Further, the sensor component 120 includes an I/O device for communicating with remote devices, such as a remote computer 110 and/or a headset 105. A memory device of the sensor component 120 may also be utilized to store software that is used by the pipe inspection robot 115 to navigate, explore, map, etc., the environment.

In an embodiment, a user interface is provided by a headset 105, which may be used to communicate directly with the pipe inspection robot 115 or may be used in connection with another device such as a computer 110. The headset 105 may be worn by an operator while using the pipe inspection robot 115, e.g., as part of a control suite for controlling the functions of the pipe inspection robot 115.

Figure 2:
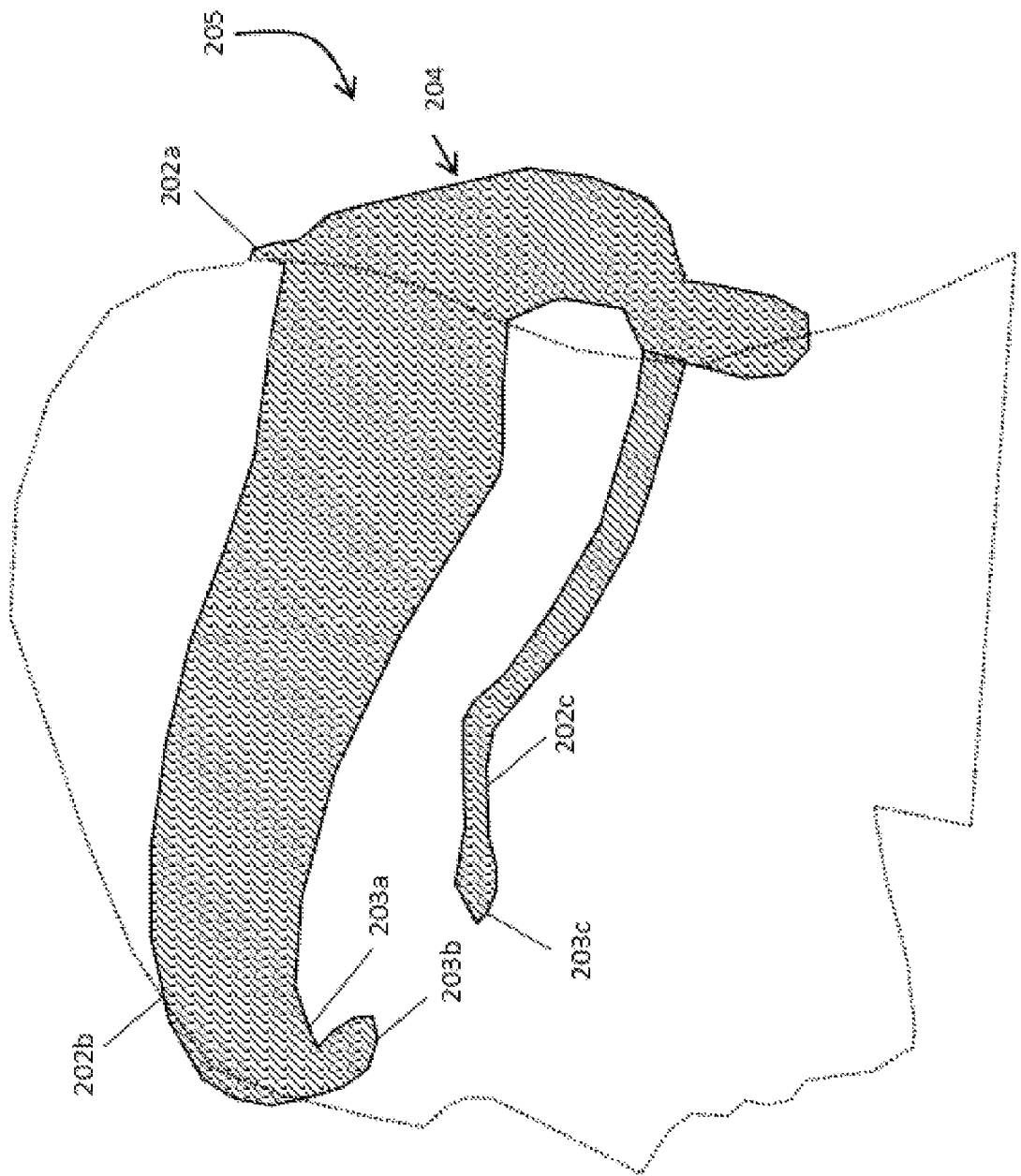
FIG. 2 illustrates an example head mounted controller.

As illustrated in FIG. 2, the headset 205 includes a plurality of projections 202a-c that secure the headset 200 in place on a user's head and act to transmit data sensed by EEG contacts (electrodes or other suitable sensors) 203a-c. The sensed data corresponds to EEG data or brain activity and is delivered to a central part 204 of the headset 205, which includes circuitry for processing EEG data and/or communicating the EEG data to a remote device for processing. The headset 205 therefor collects data that is reflective of the user's brain activity while wearing the headset 205. In one embodiment, the sensors 203a-c sense electrical activity at or near the surface of the skin. This sensed data is reported, e.g., via projections 202a-c to the central part 204 of the headset 205, which may in turn communicate it to another device, e.g., a laptop 110 connected to the headset 205, via wireless communication or directly to the pipe inspection robot 115.

Figure 3:
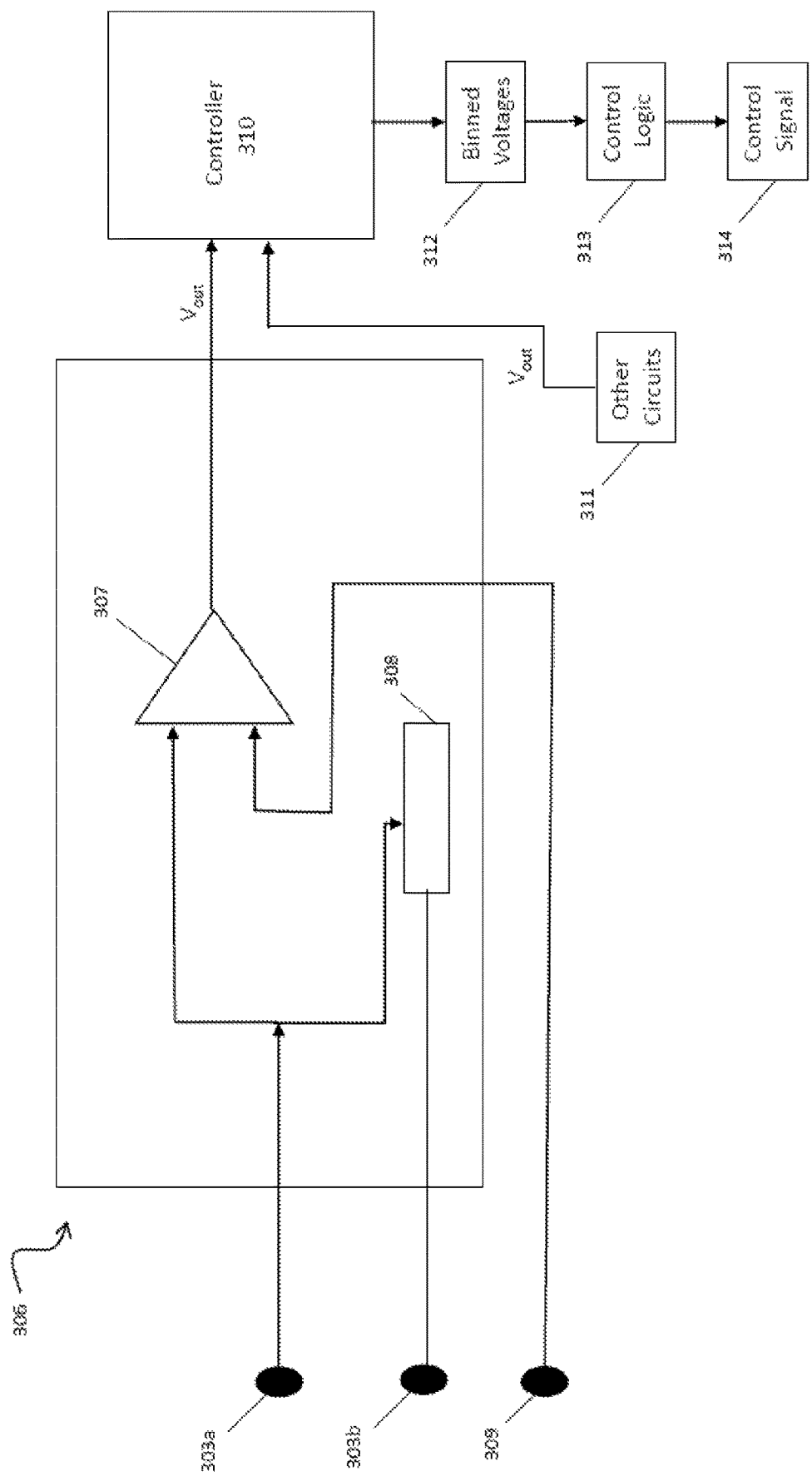
FIG. 3 illustrates an example circuit and components for generating a control signal using binned brain activity values.

Referring to FIG. 3, each electrode or sensor (e.g., located at contacts 203a-c) includes or forms part of a circuit 306 that is used to detect an amount of brain activity. By way of example, as illustrated in FIG. 3, a measurement electrode 303a is positioned within a contact, e.g., 203a of FIG. 2, to sense electrical potential at the skin of the wearer. The contact may include a so-called dry contact, formed of a polymer that permits sensing of a voltage or electrical potential at the skin of the wearer of a headset 205. The electrode 303a has a measured voltage associated therewith that is sensed and amplified via the circuit 306. The voltage may be communicated back to a differential amplifier 307, optionally with filters for filtering noise. The circuit is completed by grounding 308, e.g., including a ground contact 303b with the skin. The voltage reported from measuring electrode 303a is a relative voltage, i.e., compared to that of another measuring (reference) electrode 309. The reported amplitude of the voltage (with gain applied) is converted to a digital value and stored in a memory along with metadata such as time information.

In an embodiment, a controller 310 is provided for accepting several analog comparative amplitudes, e.g., from other such circuits 311. The controller 310 may be a microcontroller or part of a system-on-chip structure provided in a headset, e.g., within part 204 of headset 205, or may be provided by a remote device to which the headset communicates data, e.g., remote computer 110. Similarly, the control logic 313 may be implemented in a headset directly or may be implemented in a remote device such as remote computer 110. The controller 310 has a function of accumulating the amplitude values, e.g., per unit time, into bins 312 that are defined using threshold values. Having observed the brain activity in such a way, the binned value for a unit time may be mapped to a predetermined control action 313 and produce a control signal 314, as described herein.

Figures 4A, 4B:
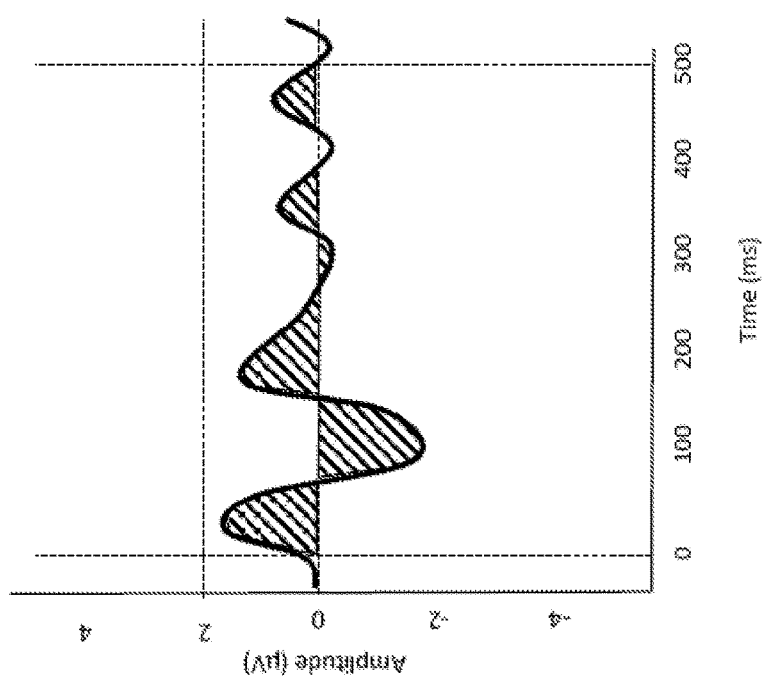
FIG. 4(A-B) illustrates an example of associating brain activity with control actions.

Referring to FIG. 4(A-B), an example of coding observed bin values to a predetermined control action is illustrated. Illustrated in FIG. 4A is an example EEG trace in microvolts/milliseconds. The example trace shows a comparative amplitude that fluctuates or oscillates between a positive and negative value over time, here about 500 ms. As described herein, the analog trace data may be converted into digital data values (e.g., absolute values) and used to quantify an amount of brain activity per unit time. In the example of FIG. 4A, the absolute value amount is about 7.5 µV/500 ms in terms of absolute value deviation from zero. Thus, a value of 7.5 is recorded for the 500 ms unit of time as a binned value. The bin value of 7.5 may be given in microvolts or other units, as may be appreciated.

In FIG. 4B, the bin value is categorized per control logic for an asset inspection robot, such as pipe inspection robot 115. Continuing the example of FIG. 4(A-B), as shown in FIG. 4B a data table may be used to store control data for a pipe inspection robot. As shown, the table lists bin categories of light, moderate and heavy, each having an associated bin threshold value or range associated therewith. As the amplitude values (or other brain activity metric of interest) is recorded and stored for a unit of time, e.g., 500 ms, the cumulative bin value (7.5 in this non-limiting example) is identified. This bin value is sorted to an appropriate bin category, here heavy activity, and the appropriate control action is identified. In this example, a trace such as that in FIG. 4A may result in a bin value of 7.5 and result in a control action of reverse drive being implemented (a reverse drive control signal being sent to the pipe inspection robot 115).

Therefore, the sensed data is binned into categories, e.g., comprised of a single or multiple bins. For example, an embodiment bins sensed voltages into heavy, moderate, and light bins for a period of time. The bins may be set to threshold reported voltages into an appropriate category, with the overall or cumulative bin value being used to decide as to the type of brain activity (e.g., heavy, moderate or light). The binned brain activity is used to make control decisions that impact the functioning of the pipe inspection robot 115, e.g., whether to commence or continue driving forward, an amount of gain, a sensor or sensors to be operated or cease operation, etc. This binning type control permits for a limited set of control actions to be easily mapped to straightforward brain activity measurements, and avoids difficulties in attempting more refined pattern or spatial brain activity mapping, e.g., using beamforming techniques or attempting to identify frequency domain differences via FFT analysis. As such, the headset provides a reliable user input device for the limited set of control actions, which are easy to learn and actively control.

Figure 5:
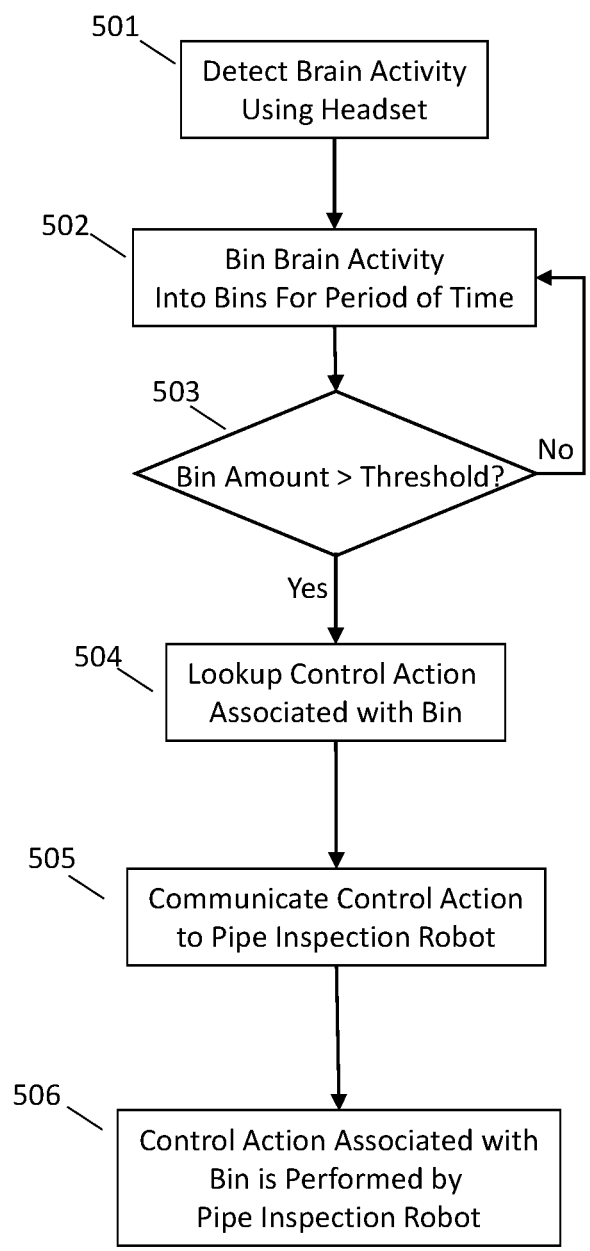
FIG. 5 illustrates an example method of controlling a pipe inspection robot using a head mounted controller.

By way of example, illustrated in FIG. 5 is a method of controlling a pipe inspection robot with data collected from a headset such as headset 205. At 501, an embodiment detects activity using the headset, e.g., EEG data is collected via sensors 203a-c of headset 205. This sensed data is binned for a period of time at 502, which can be modified. For example, the brain activity is binned based on intensity into bins associated with light brain activity, intermediate brain activity, or heavy brain activity, for a period or time slot. This brain activity may be binned for example based on amplitude of readings from the sensors 203a-c or some other measure that is indicative of overall brain activity level.

At 503 an embodiment determines if the bin amount(s) exceed a threshold. For example, an embodiment determines if brain activity for a period of time has been sorted to a heavy brain activity bin, where more than one bin may be considered collectively as a category. If a threshold is reached, as determined at 503, a look up is done to identify a control action associated with the bin(s) or categories at 504. For example, if a user is operating the pipe inspection robot 115 with a high level of brain activity, a look up is done to identify a control action, e.g., forward driving, reverse driving, stopping, etc. Thereafter, at 505, the control action is communicated to the pipe inspection robot, e.g., via a wireline connection between a remote device such as a laptop and the pipe inspection robot. In this case, the laptop may receive the brain activity data wirelessly from the headset.

When the control action is received by the pipe inspection robot, the pipe inspection robot modifies its behavior at 506. For example, a mobile pipe inspection robot may be stationary and providing a visual image to the user wearing the headset. The user wearing the headset may be attempting to focus on something in the image that is unclear. As such, the headset may provide output data indicating that increased brain activity is occurring in association with the user's concentration on the image. This brain activity data may in turn be binned into a heavy category, e.g., based on intensity, amplitude, frequency, etc. The heavy bin category may in turn be associated with a forward driving or stop control function for the pipe inspection robot. An embodiment therefore transforms the detected brain activity into a binned category and in turn selects an appropriate control function for the pipe inspection robot.

Figure 6:
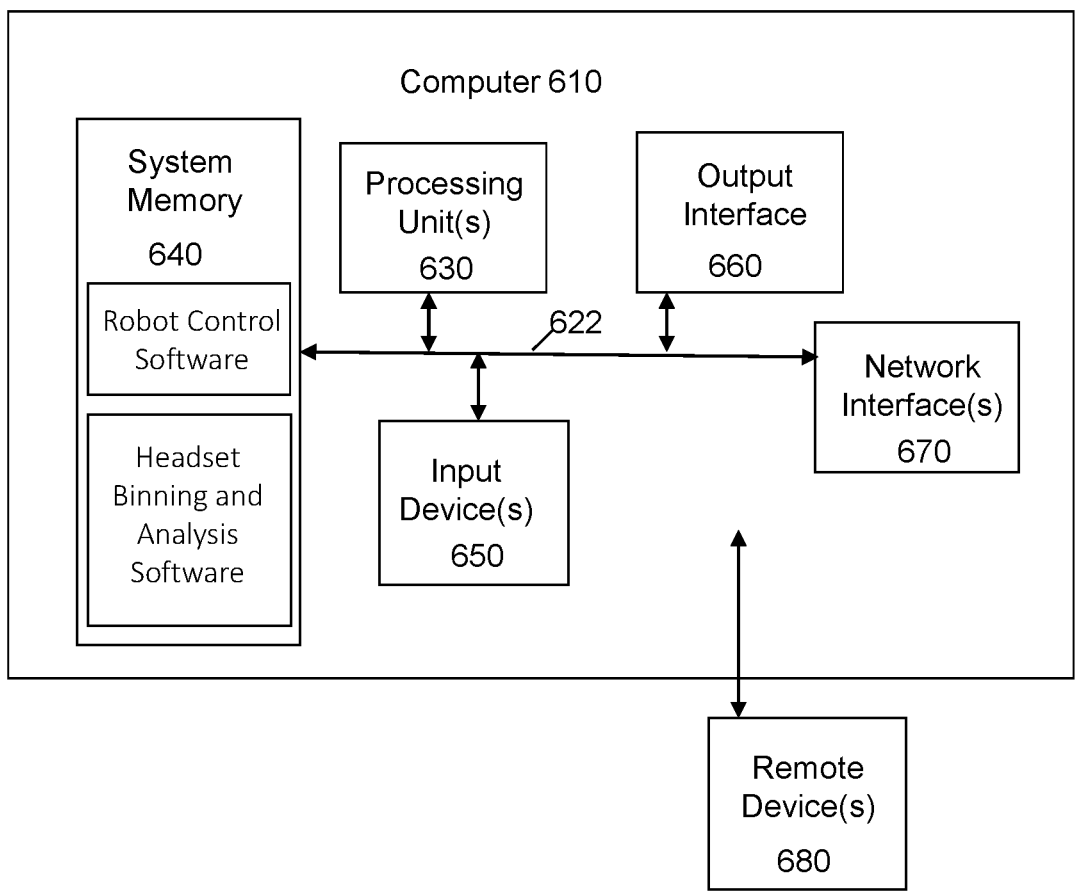
FIG. 6 illustrates an example computing device.

It will be readily understood that certain embodiments can be implemented using any of a wide variety of devices or combinations of devices. Referring to FIG. 6, an example device that may be used in implementing one or more embodiments includes a computing device (computer) 610, for example included in an inspection robot 115 and/or a computer system (e.g., a laptop or desktop computer, headset, etc.).

The computer 610 may execute program instructions or code configured to store and process data (e.g., brain activity data from a headset, control function data, etc., as described herein) and perform other functionality of the embodiments. Components of computer 610 may include, but are not limited to, a processing unit 630, a system memory 640, and a system bus 622 that couples various system components including the system memory 640 to the processing unit 630. The computer 610 may include or have access to a variety of non-transitory computer readable media. The system memory 640 may include non-transitory computer readable storage media in the form of volatile and/or nonvolatile memory devices such as read only memory (ROM) and/or random access memory (RAM). By way of example, and not limitation, system memory 640 may also include an operating system, application programs, other program modules, and program data. For example, system memory 640 may include application programs such as robot control software and/or headset binning and analysis software. Data may be transmitted by wired or wireless communication, e.g., to or from an inspection robot to another computing device, e.g., a remote device or system.

A user can interface with (for example, enter commands and information) the computer 610 through input devices such as a touch screen, keypad, headset, etc. A monitor or other type of display screen or device can also be connected to the system bus 622 via an interface, such as an interface 660. The computer 610 may operate in a networked or distributed environment using logical connections to one or more other remote computers or databases. The logical connections may include a network, such local area network (LAN) or a wide area network (WAN), but may also include other networks/buses.

It should be noted that the various functions described herein may be implemented using processor executable instructions stored on a non-transitory storage medium or device. A non-transitory storage medium or device may be, for example, an electronic, electromagnetic, or semiconductor system, apparatus, or device, or any suitable combination of the foregoing. More specific examples of a non-transitory storage medium or device include the following: a portable computer diskette, a hard disk, a random-access memory (RAM), a read-only memory (ROM), an erasable programmable read-only memory (EPROM or Flash memory), a portable compact disc read-only memory (CD-ROM), or any suitable combination of the foregoing. In the context of this document "non-transitory" includes all media except non-statutory signal media.

Program code embodied on a non-transitory storage medium or device may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, or through a hard wire connection, such as over a USB connection.

Example embodiments are described herein with reference to the figures, which illustrate example methods, devices and program products per various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific elements are used in the figures, and a particular illustration of elements has been set forth, these are non-limiting examples. In certain contexts, two or more elements may be combined, an element may be split into two or more elements, or certain elements may be re-ordered, re-organized, combined or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described to explain principles and practical application, and to enable others of ordinary skill in the art to understand the disclosure for various embodiments with various modifications as are suited to the use contemplated.

Thus, although illustrative example embodiments have been described herein regarding the accompanying figures, it is to be understood that this description is not limiting and that various changes and modifications may be made by one skilled in the art without departing from the scope or spirit of the disclosure.

What is claimed is:

1. A method of controlling a pipe inspection robot, comprising:
   detecting, from a headset, brain activity of a user wearing the headset;
   binning, using a processor, the brain activity of the user into one of a plurality of different bins associated with a plurality of control actions;
   the binning comprising accumulating brain activity values for a period of time to establish a brain activity value for the period of time;
   determining, using the brain activity value accumulated over the period of time, an intensity level of brain activity and an associated control action of the plurality of control actions;
   thereafter, identifying the control action to be sent to the pipe inspection robot based on the intensity level; and
   controlling the movement of the pipe inspection robot using a control signal associated with the control action.

2. The method of claim 1, wherein the binning comprises accumulating digital values obtained from the headset for the period of time.

3. The method of claim 2, wherein the determining comprises determining if one of a plurality of threshold levels of brain activity has accumulated over the period of time.

4. The method of claim 3, wherein the plurality of threshold levels comprises a light threshold level, a moderate threshold level, and a heavy threshold level.

5. The method of claim 4, wherein each of the light threshold level, the moderate threshold level, and the heavy threshold level comprise a separate range of values.

6. The method of claim 5, wherein the separate range of values for each respective threshold level is associated with a different voltage value obtained from the headset.

7. The method of claim 1, wherein the control action is selected from control actions comprising forward driving, reverse driving, and stopping.

8. The method of claim 1, wherein the control action is selected from control actions comprising activating a visual image capture mode, activating a sonar capture mode, and activating a light detecting and ranging (LIDAR) capture mode.

9. The method of claim 1, wherein the controlling the movement of the pipe inspection robot using a control signal associated with the control action comprises sending the control signal from a remote device to the pipe inspection robot using a tethered connection.

10. The method of claim 1, wherein the controlling the movement of the pipe inspection robot using a control signal associated with the control action comprises sending the control signal from a remote device to the pipe inspection robot wirelessly.

11. A system, comprising:
a controller comprising a processor and a memory device, the controller configured to:
receive digital voltage values associated with brain activity of a user detected by a headset worn by the user;
bin the digital voltage values into one of a plurality of different bins associated with a plurality of control actions;
the controller being configured to accumulate digital voltage values for a period of time to establish a brain activity value for the period of time;
determine, using the brain activity value accumulated over the period of time, an intensity level of brain activity and an associated control action of the plurality of control actions;
thereafter identify the control action to be sent to the pipe inspection robot based on the intensity level; and
control the movement of a pipe inspection robot using a control signal associated with the control action.

12. The system of claim 11, comprising the pipe inspection robot.

13. The system of claim 11, comprising the headset.

14. The system of claim 11, comprising one or more of the pipe inspection robot and the headset;
wherein the controller is disposed within one of the pipe inspection robot and the headset.

15. A computer program product, comprising:
a non-transitory storage medium having computer executable code stored therein, the computer executable code comprising:
code that obtains, from a headset, brain activity of a user wearing the headset;
code that bins the brain activity of the user into one of a plurality of different bins associated with a plurality of control actions;
the code that bins comprising code that accumulates brain activity values for a period of time to establish a brain activity value associated with an intensity level for the period of time;
code that determines, using the brain activity value accumulated over the period of time, an intensity level of brain activity and an associated control action of the plurality of control actions;
code that thereafter identifies the control action to be sent to the pipe inspection robot based on the intensity level; and
code that controls the movement of the pipe inspection robot using a control signal associated with the control action.

16. The computer program product of claim 15, wherein the code that bins comprises code that accumulates digital values obtained from the headset for the period of time.

17. The computer program product of claim 16, wherein the code that determines comprises code that determines if one of a plurality of threshold levels of brain activity has accumulated over the period of time.

18. The computer program product of claim 17, wherein the plurality of threshold levels comprises a light threshold level, a moderate threshold level, and a heavy threshold level.

19. The computer program product of claim 18, wherein each of the light threshold level, the moderate threshold level, and the heavy threshold level comprise a separate range of values.

20. The computer program product of claim 19, wherein the separate range of values for each respective threshold level is associated with a different voltage value obtained from the headset.

* * * * *